US011797290B2

(12) United States Patent
Iwata et al.

(10) Patent No.: US 11,797,290 B2
(45) Date of Patent: Oct. 24, 2023

(54) UPDATE CONTROL DEVICE AND UPDATE CONTROL METHOD

(71) Applicant: Mitsubishi Electric Corporation, Tokyo (JP)

(72) Inventors: Masao Iwata, Tokyo (JP); Yoshihiro Nakai, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 371 days.

(21) Appl. No.: 17/288,265

(22) PCT Filed: Dec. 4, 2018

(86) PCT No.: PCT/JP2018/044590
§ 371 (c)(1),
(2) Date: Apr. 23, 2021

(87) PCT Pub. No.: WO2020/115819
PCT Pub. Date: Jun. 11, 2020

(65) Prior Publication Data
US 2021/0389940 A1 Dec. 16, 2021

(51) Int. Cl.
G06F 8/65 (2018.01)
B60L 50/60 (2019.01)
(Continued)

(52) U.S. Cl.
CPC .............. G06F 8/65 (2013.01); B60L 3/0046 (2013.01); B60L 50/60 (2019.02); B60L 53/305 (2019.02);
(Continued)

(58) Field of Classification Search
USPC ........................................................ 717/168
See application file for complete search history.

(56) References Cited

U.S. PATENT DOCUMENTS

2003/0209375 A1 11/2003 Suzuki et al.
2010/0145568 A1 6/2010 Watanabe
(Continued)

FOREIGN PATENT DOCUMENTS

JP 2001-057711 A 2/2001
JP 2010-142001 A 6/2010
(Continued)

OTHER PUBLICATIONS

J. Timpner and L. Wolf; "A Back-End System for an Autonomous Parking and Charging System for Electric Vehicles"; 2012 IEEE International Electric Vehicle Conference (pp. 1-8); 2012 (Year: 2012).*
International Search Report for PCT/JP2018/044590 dated Feb. 26, 2019 [PCT/ISA/210].

Primary Examiner — Qing Chen
Assistant Examiner — Clint Thatcher
(74) Attorney, Agent, or Firm — Sughrue Mion, PLLC; Richard C. Turner

(57) ABSTRACT

The update control device is an update control device that controls update of software for one of electronic devices in a vehicle driven by a replaceable battery, and includes: an update method setting unit for selectively setting an update method of the software to either a first update method by replacement of the battery or a second update method by wireless communication, by using at least one of information indicating a remaining amount of the battery, information indicating a size of data to be used for the update, information indicating an urgency of the update, or information indicating a search result of one or more charging stations in a search target area including a position of the vehicle; and a reservation process executing unit for executing, when the update method is set to the first update method, a reservation process of making a reservation for a replacement battery to a reservation target charging station (Continued)

among the charging stations included in the search result and a storage request process of requesting the reservation target charging station to store the data in the replacement battery.

9 Claims, 7 Drawing Sheets

(51) Int. Cl.
*B60L 58/12* (2019.01)
*B60L 53/30* (2019.01)
*B60L 53/66* (2019.01)
*B60L 53/80* (2019.01)
*B60L 3/00* (2019.01)

(52) U.S. Cl.
CPC ............. *B60L 53/665* (2019.02); *B60L 53/80* (2019.02); *B60L 58/12* (2019.02)

(56) References Cited

U.S. PATENT DOCUMENTS

| | | | |
|---|---|---|---|
| 2012/0309455 A1* | 12/2012 | Klose | B60L 53/68 455/557 |
| 2013/0282472 A1* | 10/2013 | Penilla | B60L 53/80 705/14.1 |
| 2016/0303990 A1* | 10/2016 | Penilla | G06F 3/0362 |
| 2016/0368464 A1* | 12/2016 | Hassounah | B60L 53/80 |
| 2019/0042228 A1* | 2/2019 | Nolan | G06F 8/64 |
| 2019/0294135 A1* | 9/2019 | Madrid | G05B 19/0426 |
| 2020/0215930 A1* | 7/2020 | Izumi | B60R 16/02 |

FOREIGN PATENT DOCUMENTS

| | | |
|---|---|---|
| JP | 2012-199869 A | 10/2012 |
| WO | 2015/001930 A1 | 1/2015 |

* cited by examiner

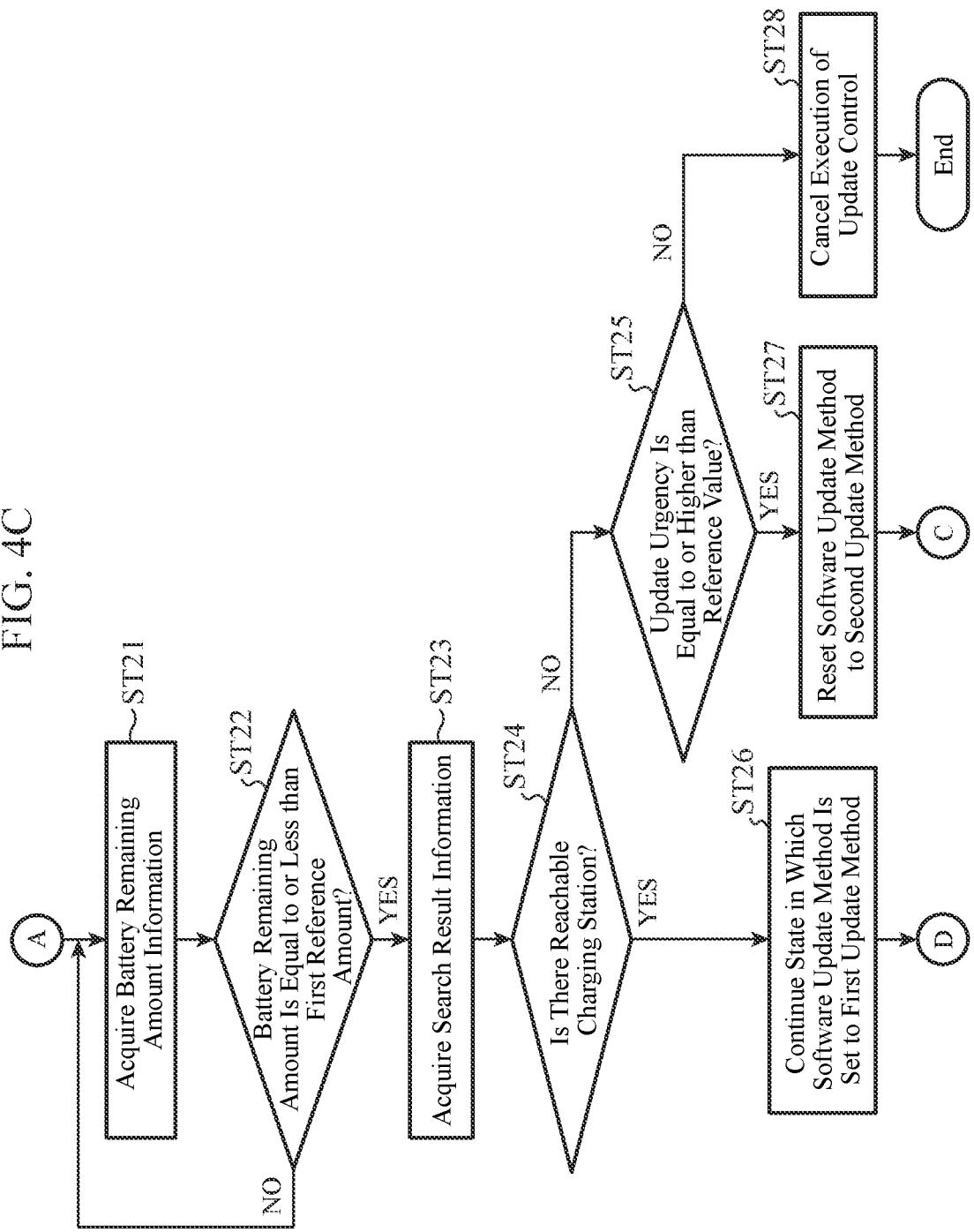

UPDATE CONTROL DEVICE AND UPDATE CONTROL METHOD

CROSS REFERENCE TO RELATED APPLICATIONS

This application is a National Stage of International Application No. PCT/JP2018/044590 filed Dec. 4, 2018.

TECHNICAL FIELD

The present invention relates to an update control device and an update control method.

BACKGROUND ART

In recent years, various electronic devices have been provided in vehicles. Conventionally, a technology for updating software of these electronic devices by so-called "Over the Air (OTA)" has been developed. Further, in the case where the vehicle is driven by a battery, a technique for updating the software by so-called "power line communication" when the battery is charged by a wired connection has been developed (see, for example, Patent Literature 1).

CITATION LIST

Patent Literature

Patent Literature 1: JP 2010-142001 A

SUMMARY OF INVENTION

Technical Problem

A so-called "open" line, or a public line, is used for software update by OTA. Normally, the communication speed on a public line has a predetermined upper limit, and users of the public line are required to pay a communication fee depending on the amount of communication. Therefore, when the size of data used for update is large, there is a problem that the time required for the update is long and a problem that the payment amount by the user is large.

On the other hand, software update by power line communication at the time of battery charging can shorten the time required for the update. In addition, it is possible to eliminate the need for the user to pay the communication fee, or to reduce the communication fee. However, the time required for charging varies depending on the capacity and remaining amount of the battery. In addition, the time required for the update varies depending on the size of data used for the update and the like. Therefore, there is a case where the time required for the charging is shorter than the time required for the update. In this case, since the charging is completed before the update is completed, there is a problem that the update cannot be completed normally.

As described above, a plurality of types of update methods for updating software of electronic devices in a vehicle have been developed. Which of the plurality of types of update methods is preferable varies depending on the situation at that time. Since the prior art does not correspond to a plurality of types of update methods and does not select a suitable update method from the plurality of types of update methods, there has been a problem that it is not possible to avoid the above-mentioned problems.

The present invention has been made to solve the above problems, and has an object to provide an update control device and an update control method capable of selectively setting, when software of one of electronic devices in a vehicle driven by a replaceable battery is to be updated, a method of the update to any of a plurality of types of methods.

Solution to Problem

The update control device of the present invention is an update control device that controls update of software for one of electronic devices in a vehicle driven by a replaceable battery, and includes: processing circuitry to selectively an update method of the software to either a first update method by replacement of the battery or a second update method by wireless communication, by using at least one of information indicating a remaining amount of the battery, information indicating a size of data to be used for the update, information indicating an urgency of the update, or information indicating a search result of one or more charging stations in a search target area including a position of the vehicle; and to execute, when the update method is set to the first update method, a reservation process of making a reservation for a replacement battery to a reservation target charging station among the charging stations included in the search result and a storage request process of requesting the reservation target charging station to store the data in the replacement battery.

Advantageous Effects of Invention

According to the present invention, since it is configured as described above, it is possible to selectively set, when software of one of electronic devices in a vehicle driven by a replaceable battery is to be updated, a method of the update to any of a plurality of types of methods.

BRIEF DESCRIPTION OF DRAWINGS

FIG. 4C is a flowchart showing the operation of the control device having the update control device according to the first embodiment.

DESCRIPTION OF EMBODIMENTS

Hereinafter, in order to explain this invention in more detail, a mode for carrying out this invention will be described by referring to the accompanying drawings.

First Embodiment

Figure 1:
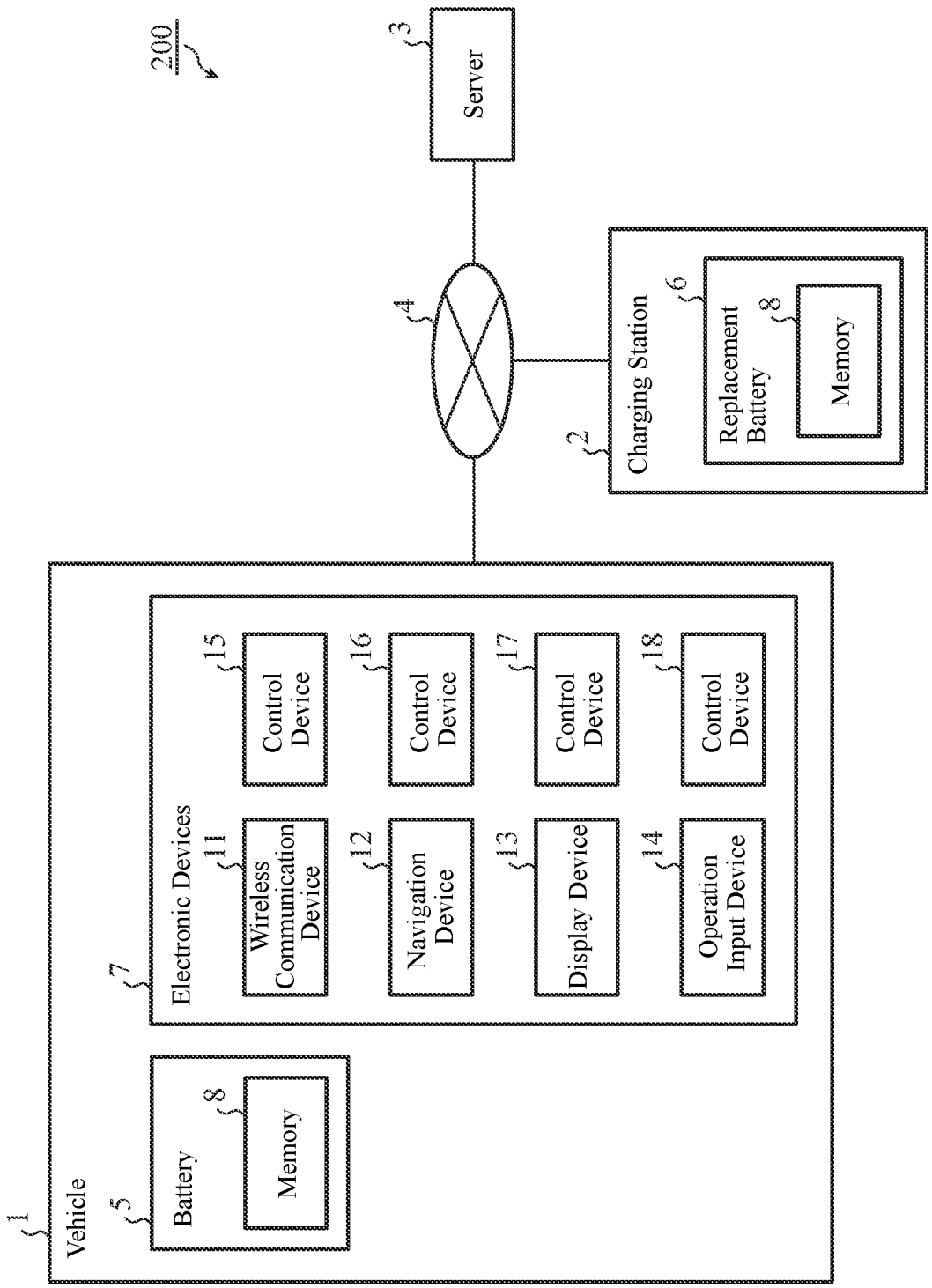
FIG. 1 is an explanatory diagram showing a system configuration of a software update system according to a first embodiment.

FIG. 1 is an explanatory diagram showing a system configuration of a software update system according to a first embodiment. A software update system 200 of the first embodiment will be described by referring to FIG. 1.

As shown in FIG. 1, a vehicle 1, a charging station 2, and a server 3 can communicate with each other by a network 4. The connection to the network 4 in the vehicle 1 is by wireless communication and by using a public line. Specifically, for example, the connection uses a 3rd Generation (3G) line, a 4th Generation (4G) line, or a wireless Local Area Network (LAN) line.

On the other hand, the connection to the network 4 in the charging station 2 may be by wireless communication or by wired communication. Further, the connection may be made using a public line or a dedicated line. Similarly, the connection to the network 4 in the server 3 may be by wireless communication or by wired communication. Further, the connection may be made using a public line or a dedicated line.

The vehicle 1 is driven by a replaceable battery 5. The charging station 2 has a facility for charging a replacement battery 6 for the battery 5. At the charging station 2, the operation of replacing the battery 5 (more specifically, the battery 5 having a small remaining amount) mounted on the vehicle 1 with a charged replacement battery 6 is executed.

The vehicle 1 has electronic devices 7. The electronic devices 7 include, for example, a wireless communication device 11, a navigation device 12, a display device 13, an operation input device 14, and a plurality of control devices 15 to 18.

The wireless communication device 11 includes, for example, a dedicated transmitter and a dedicated receiver. The navigation device 12 includes, for example, a Global Positioning System (GPS) receiver and a dedicated computer. The display device 13 includes, for example, a liquid crystal display or an organic Electro Luminescence (EL) display. The operation input device 14 includes, for example, at least one of a touch panel, a hardware key, a remote controller, a microphone for voice recognition, and a camera for gesture recognition. Each of the plurality of control devices 15 to 18 includes, for example, an Electronic Control Unit (ECU).

Note that, the wireless communication device 11, the navigation device 12, the display device 13, and the operation input device 14 may be provided in a general-purpose portable information terminal, for example, a smartphone. Further, the navigation device 12, the display device 13, and the operation input device 14 may be provided in a dedicated portable information terminal, a so-called "Portable Navigation Device (PND)". These portable information terminals are, for example, attachable to and detachable from a dashboard of the vehicle 1.

The server 3 distributes data (hereinafter sometimes referred to as "update data") to be used for updating software of the electronic devices 7 (hereinafter sometimes simply referred to as "software"). The battery 5 has a memory 8 for storing update data. That is, the replacement battery 6 has a memory 8 for storing update data.

Here, the software of the electronic devices 7 can be freely updated by replacing the battery 5. Hereinafter, the software update method by replacing the battery 5 is referred to as a "first update method". In the first update method, a process of receiving update data from the server 3 and a process of storing the received update data in the memory 8 of the replacement battery 6 are executed at the charging station 2. Further, after replacement of the battery 5, a process of updating the software to be updated using the stored update data is executed in the vehicle 1. Hereinafter, among the controls for implementing these processes, the control executed in the vehicle 1 is referred to as "first update control".

In addition, the software of the electronic devices 7 can be freely updated by OTA. Hereinafter, the software update method by OTA is referred to as a "second update method". In the second update method, a process of receiving update data from the server 3 and a process of updating the software to be updated using the received update data are executed in the vehicle 1. Hereinafter, among the controls for implementing these processes, the control executed in the vehicle 1 is referred to as "second update control". In addition, the first update control and the second update control are collectively referred to as "update control".

Note that, normally, the software update system 200 includes a plurality of charging stations 2. In FIG. 1, only one charging station 2 among the plurality of charging stations 2 is shown. In addition, each of the plurality of charging stations 2 is usually capable of charging a plurality of replacement batteries 6. In FIG. 1, only one replacement battery 6 among the plurality of replacement batteries 6 is shown. In the first update method, in one of the plurality of charging stations 2, a process of storing update data in the memory 8 of one of the plurality of replacement batteries 6 is executed.

Figure 2:
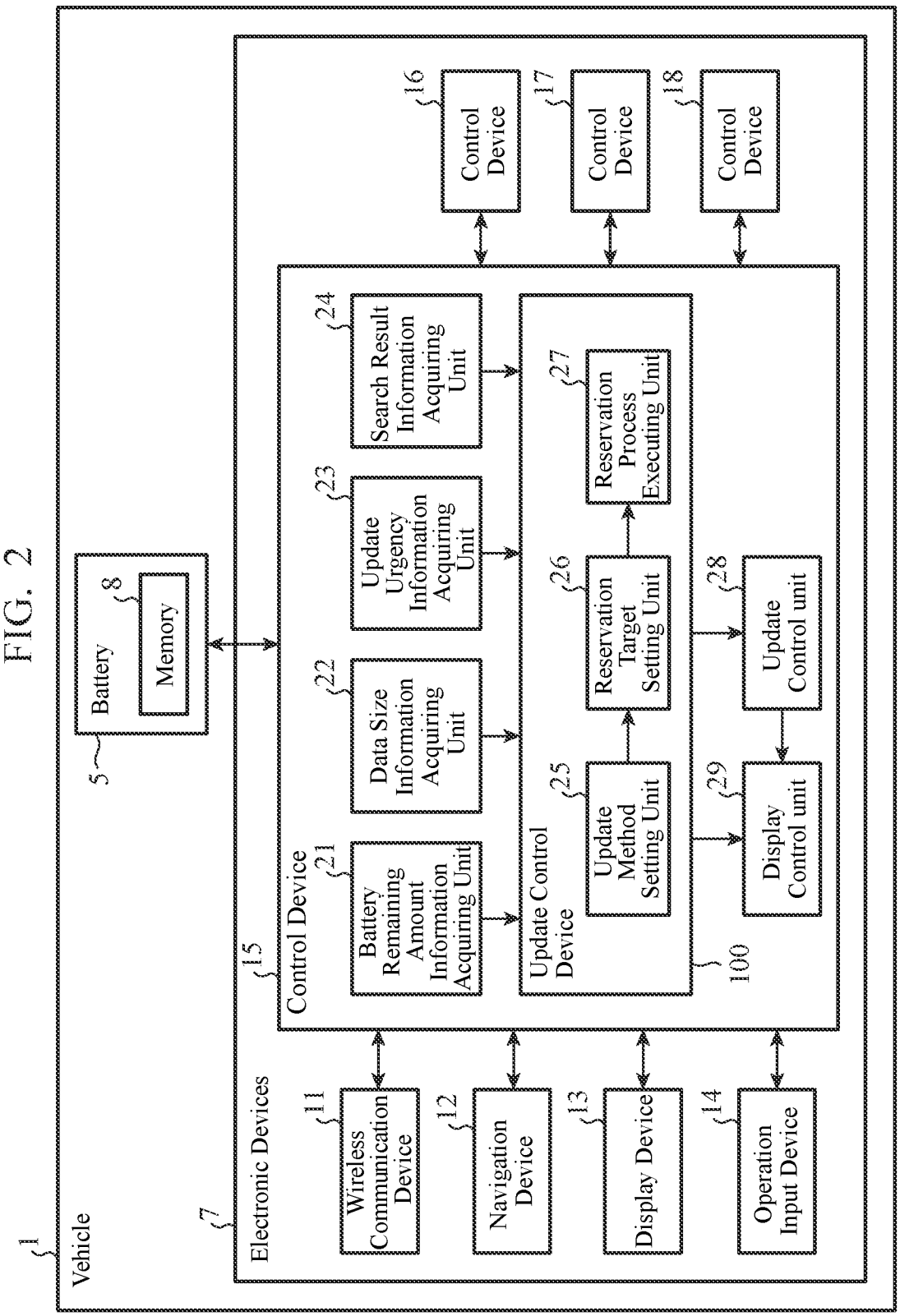
FIG. 2 is a block diagram showing a state in which a control device having an update control device according to the first embodiment is provided in a vehicle.

FIG. 2 is an explanatory diagram showing a state in which a control device having an update control device according to the first embodiment is provided in the vehicle. An update control device 100 of the first embodiment will be described by referring to FIG. 2.

A battery remaining amount information acquiring unit 21 acquires information indicating the battery remaining amount (hereinafter referred to as "battery remaining amount information") by monitoring the remaining amount of the battery 5 (hereinafter referred to as "battery remaining amount").

A data size information acquiring unit 22 acquires information (hereinafter referred to as "data size information") indicating the size (hereinafter referred to as "data size") of the update data from the wireless communication device 11. That is, this data size information is received from the server 3 by the wireless communication device 11.

An update urgency information acquiring unit 23 acquires information (hereinafter referred to as "update urgency information") indicating urgency (hereinafter referred to as "update urgency") of the update using the update data from the wireless communication device 11. That is, this update urgency information is received from the server 3 by the wireless communication device 11. The update urgency is, for example, represented by a value in five levels, and the larger the value, the higher the update urgency.

The navigation device 12 has a function of executing a process (hereinafter referred to as "search process") of searching for a charging station 2 (hereinafter sometimes referred to as a "peripheral charging station") within an area of a predetermined range (hereinafter referred to as a "search target area") including a position of the vehicle 1 (hereinafter referred to as "host vehicle position"). For the search process, various search techniques known in the technical field of the car navigation system can be used. Detailed description of these search techniques will be omitted. A search result information acquiring unit 24 acquires information indicating the result of the search process (hereinafter referred to as "search result information") from the navigation device 12.

The search result information includes, for example, information indicating the presence or absence of peripheral charging stations, and information indicating a distance (more specifically, a linear distance or a shortest route distance) from the host vehicle position to each peripheral charging station when there is one or more peripheral charging stations. In addition to this, the search result information may include information indicating a map of the search target area, information indicating the host vehicle position, information indicating the position of each peripheral charging station, information indicating a route from the host vehicle position to each peripheral charging station, and the like.

An update method setting unit 25 selectively sets the software update method to the first update method or the second update method by using the battery remaining amount information acquired by the battery remaining amount information acquiring unit 21, the data size information acquired by the data size information acquiring unit 22, the update urgency information acquired by the update urgency information acquiring unit 23, and the search result information acquired by the search result information acquiring unit 24. A specific example of a method of setting the software update method by using these pieces of information will be described later by referring to the flowchart of FIG. 4.

When the software update method is set to the first update method by the update method setting unit 25, a reservation process executing unit 27 executes a process (hereinafter referred to as "reservation process") of making a reservation for a replacement battery 6 to one charging station 2 (hereinafter referred to as "reservation target charging station") among one or more charging stations 2 included in the search result information. In addition, the reservation process executing unit 27 executes a process of requesting the reservation target charging station to receive update data from the server 3 (hereinafter referred to as "reception request process"), and executes a process of requesting the reservation target charging station to store the received update data in the memory 8 of the reserved replacement battery 6 (hereinafter referred to as "storage request process").

When the software update method is set to the first update method by the update method setting unit 25, a reservation target setting unit 26 sets a reservation target charging station by using the battery remaining amount information acquired by the battery remaining amount information acquiring unit 21 and the search result information acquired by the search result information acquiring unit 24. A specific example of a method of setting a reservation target charging station by using these pieces of information will be described later by referring to the flowchart of FIG. 4.

An update control unit 28 executes the first update control when the software update method is set to the first update method by the update method setting unit 25.

That is, in this case, at the reservation target charging station, a process of setting one replacement battery 6 (hereinafter referred to as "reservation target battery") among one or more replacement batteries 6 being charged or charged as the reservation target is executed in response to the reservation process. In addition, a process of receiving update data from the server 3 is executed in response to the reception request process. Further, in response to the storage request process, a process of storing the received update data in the memory 8 of the reservation target battery is executed.

Therefore, when the battery 5 is replaced with the reservation target battery at the reservation target charging station, the memory 8 of a battery 5 after the replacement stores the update data. By the first update control, a process of updating the software to be updated and the like using the stored update data are executed in the vehicle 1.

Further, the update control unit 28 executes the second update control when the software update method is set to the second update method by the update method setting unit 25. By the second update control, a process of receiving update data from the server 3 using the wireless communication device 11 and a process of updating the software to be updated using the received update data are executed in the vehicle 1.

A display control unit 29 executes a control for displaying various images on the display device 13 when the update method setting unit 25 sets the software update method, when the reservation target setting unit 26 sets the reservation target charging station, or when the update control unit 28 executes the update control. A specific example of the image displayed on the display device 13 will be described later by referring to the flowchart of FIG. 4.

The battery remaining amount information acquiring unit 21, the data size information acquiring unit 22, the update urgency information acquiring unit 23, the search result information acquiring unit 24, the update method setting unit 25, the reservation target setting unit 26, the reservation process executing unit 27, the update control unit 28, and the display control unit 29 are provided in, for example, one control device 15 among the plurality of control devices 15 to 18. The main part of the update control device 100 includes the update method setting unit 25, the reservation target setting unit 26, and the reservation process executing unit 27.

Next, a hardware configuration of the main part of the control device 15 will be described by referring to FIG. 3.

Figure 3A:
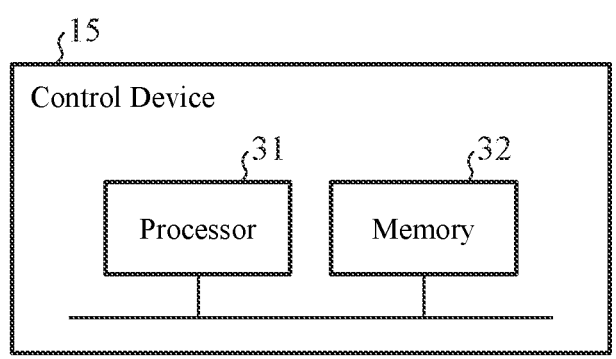
FIG. 3A is an explanatory diagram showing a hardware configuration of the control device having the update control device according to the first embodiment.

For example, as shown in FIG. 3A, the control device 15 has a processor 31 and a memory 32. A non-volatile memory of the memory 32 stores a program corresponding to functions of the battery remaining amount information acquiring unit 21, the data size information acquiring unit 22, the update urgency information acquiring unit 23, the search result information acquiring unit 24, the update method setting unit 25, the reservation target setting unit 26, the reservation process executing unit 27, the update control unit 28, and the display control unit 29. The processor 31 loads the stored program into a volatile memory of the memory 32 and executes the loaded program. As a result, the functions of the battery remaining amount information acquiring unit 21, the data size information acquiring unit 22, the update urgency information acquiring unit 23, the search result information acquiring unit 24, the update method setting unit 25, the reservation target setting unit 26, the reservation process executing unit 27, the update control unit 28, and the display control unit 29 are implemented.

Figure 3B:
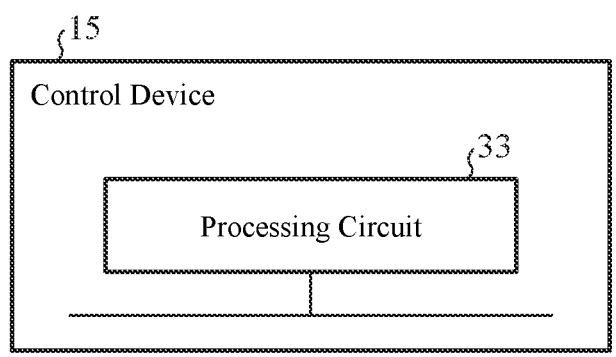
FIG. 3B is an explanatory diagram showing another hardware configuration of the control device having the update control device according to the first embodiment.
Figure 4A:
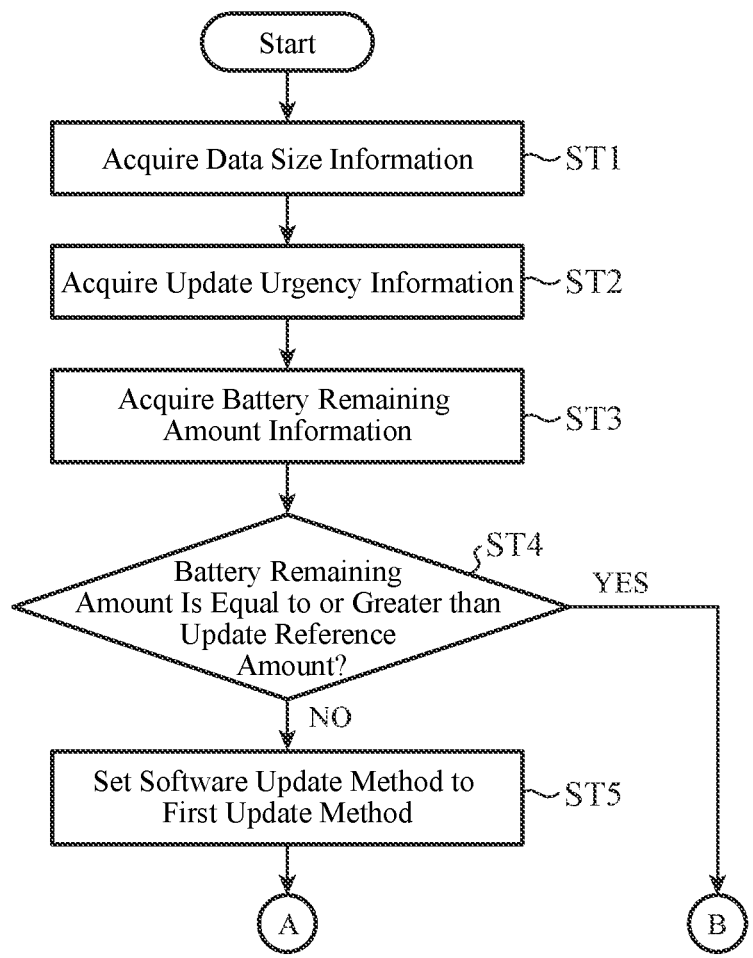
FIG. 4A is a flowchart showing the operation of the control device having the update control device according to the first embodiment.
Figure 4B:
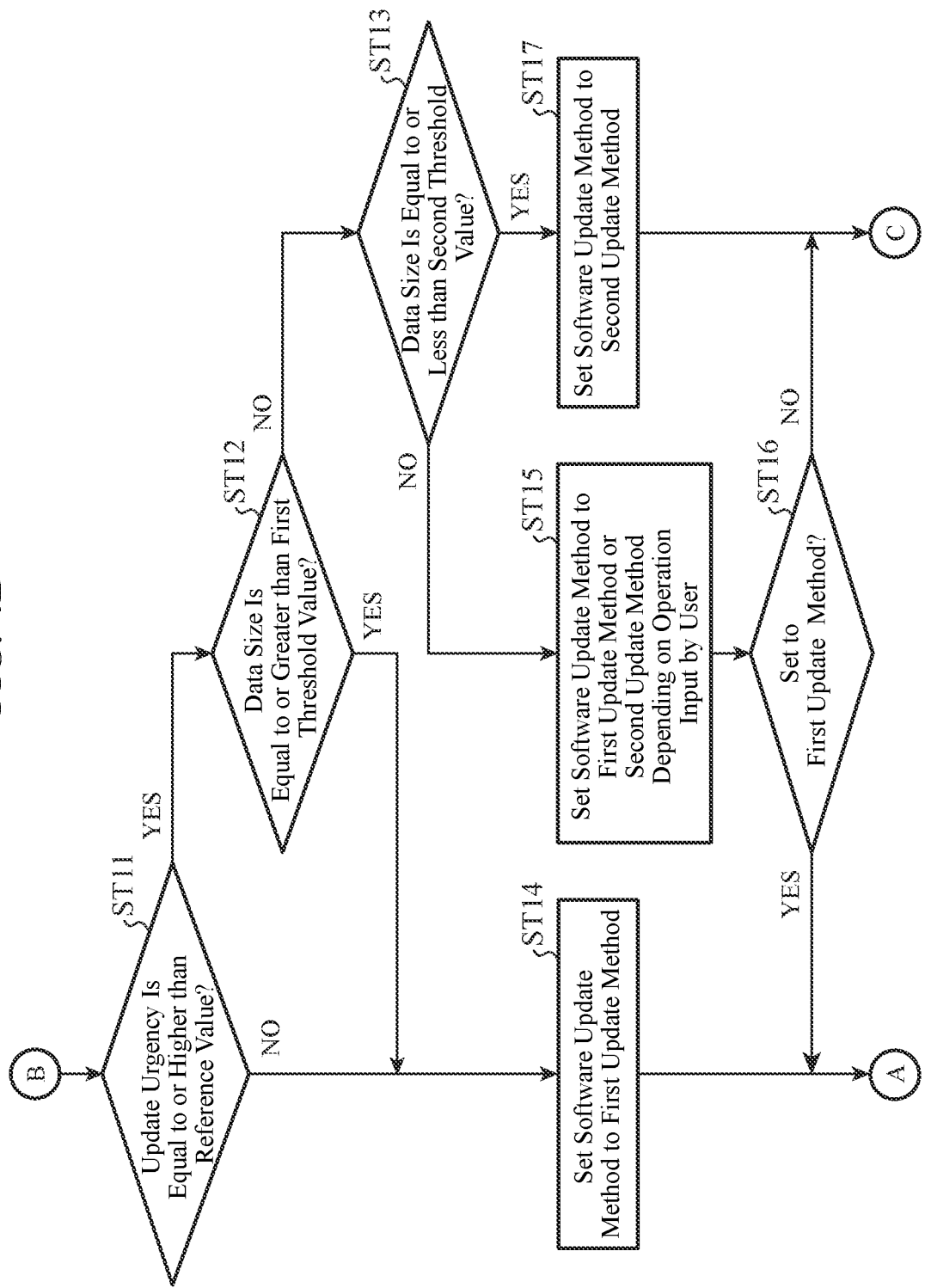
FIG. 4B is a flowchart showing the operation of the control device having the update control device according to the first embodiment.
Figure 4D:
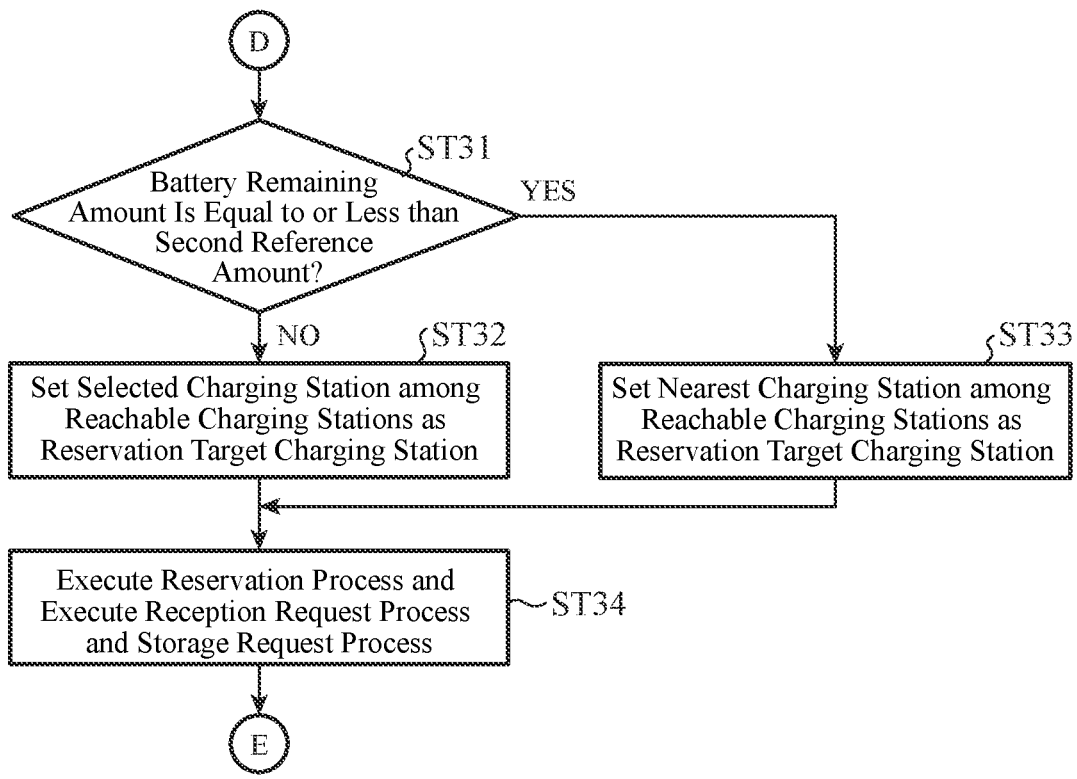
FIG. 4D is a flowchart showing the operation of the control device having the update control device according to the first embodiment.
Figure 4E:
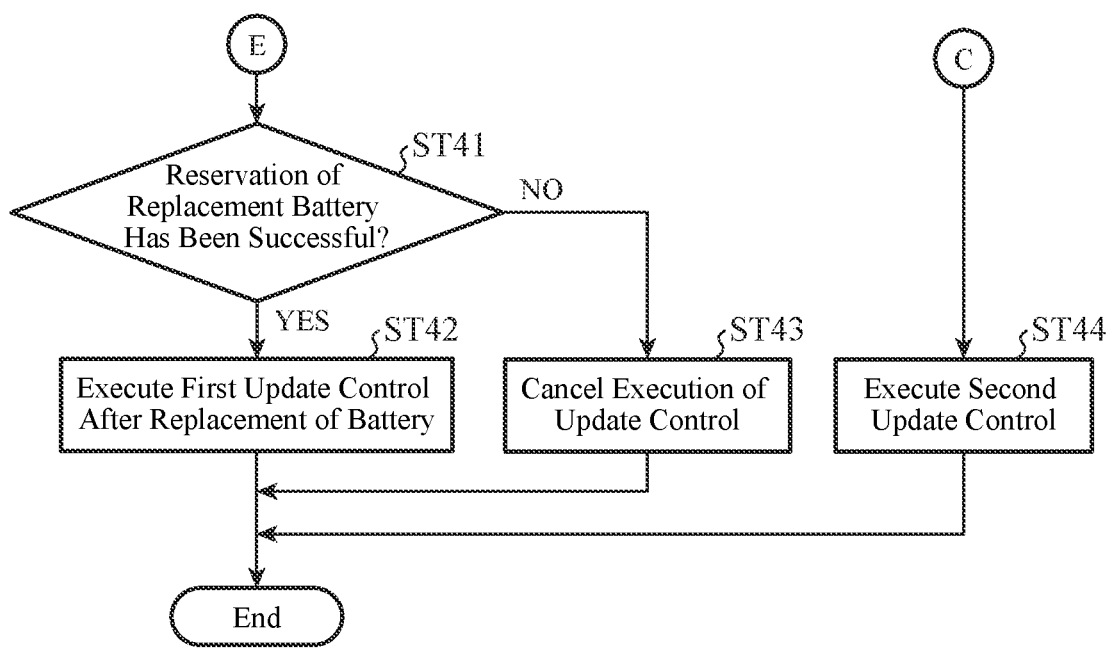
FIG. 4E is a flowchart showing the operation of the control device having the update control device according to the first embodiment.

Alternatively, for example, as shown in FIG. 3B, the control device 15 has a processing circuit 33. In this case, the functions of the battery remaining amount information acquiring unit 21, the data size information acquiring unit 22, the update urgency information acquiring unit 23, the search result information acquiring unit 24, the update method setting unit 25, the reservation target setting unit 26, the reservation process executing unit 27, the update control unit 28, and the display control unit 29 are implemented by the dedicated processing circuit 33.

Alternatively, for example, the control device 15 has a processor 31, a memory 32, and a processing circuit 33 (not shown). In this case, part of the functions of the battery remaining amount information acquiring unit 21, the data size information acquiring unit 22, the update urgency information acquiring unit 23, the search result information acquiring unit 24, the update method setting unit 25, the reservation target setting unit 26, the reservation process executing unit 27, the update control unit 28, and the display control unit 29 are implemented by the processor 31 and the memory 32, and the remaining functions are implemented by the dedicated processing circuit 33.

The processor 31 is composed of, for example, at least one of a Central Processing Unit (CPU), a Graphics Processing Unit (GPU), a microprocessor, a microcontroller, or a Digital Signal Processor (DSP).

The volatile memory of the memory 32 is composed of, for example, a Random Access Memory (RAM). The non-volatile memory of the memory 32 is composed of, for example, at least one of a Read Only Memory (ROM), a flash memory, an Erasable Programmable Read Only Memory (EPROM), an Electrically Erasable Programmable Read-Only Memory (EEPROM), a Solid State Drive (SSD), or a Hard Disk Drive (HDD).

The processing circuit 33 is composed of, for example, at least one of an Application Specific Integrated Circuit (ASIC), a Programmable Logic Device (PLD), a Field-Programmable Gate Array (FPGA), a System-on-a-Chip (SoC), or a system Large-Scale Integration (LSI).

Note that, the hardware configuration of the main part of each of the other control devices 16 to 18 is the same as the hardware configuration of the main part of the control device 15. Therefore, the illustration and description of the hardware configuration of the main part of each of these control devices 16 to 18 will be omitted. In these control devices 16 to 18, various functions in various controls for the vehicle 1 are implemented.

Next, referring to the flowchart of FIG. 4, regarding the operation of the control device 15, the operations of the battery remaining amount information acquiring unit 21, the data size information acquiring unit 22, the update urgency information acquiring unit 23, the search result information acquiring unit 24, the update method setting unit 25, the reservation target setting unit 26, the reservation process executing unit 27, and the update control unit 28 will be mainly described. At the same time, the image displayed on the display device 13 will be described.

The wireless communication device 11 transmits information indicating the current software versions of the electronic devices 7 (hereinafter referred to as "version information") to the server 3 at a predetermined timing (for example, periodically). The server 3 determines whether or not the software needs to be updated by using the version information. When it is determined that the software needs to be updated, the server 3 transmits a signal (hereinafter referred to as "update notification signal") to notify that effect to the vehicle 1, and also transmits data size information and update urgency information related to the update to the vehicle 1. When the update notification signal, the data size information, and the update urgency information are received by the wireless communication device 11, the processing of step ST1 is started.

First, in step ST1, the data size information acquiring unit 22 acquires the data size information from the wireless communication device 11. This data size information is received from the server 3 by the wireless communication device 11. Further, in step ST2, the update urgency information acquiring unit 23 acquires the update urgency information from the wireless communication device 11. This update urgency information is received from the server 3 by the wireless communication device 11.

Next, in step ST3, the battery remaining amount information acquiring unit 21 acquires the battery remaining amount information. Next, in step ST4, the update method setting unit 25 determines whether or not the battery remaining amount is equal to or greater than a predetermined amount (hereinafter referred to as "update reference amount") by using the acquired battery remaining amount information. The update reference amount is set to a value that indicates whether or not software update by OTA (that is, software update by the second update method) is possible with the current battery remaining amount.

When it is determined that the battery remaining amount is less than the update reference amount (step ST4 "NO"), in step ST5, the update method setting unit 25 sets the software update method to the first update method. At this time, the display control unit 29 may execute a control for displaying an image (hereinafter referred to as "first update notice image") for notifying the software update by the first update method on the display device 13.

When it is determined that the battery remaining amount is equal to or greater than the update reference amount (step ST4 "YES"), in step ST11, the update method setting unit 25 determines whether or not the update urgency is equal to or higher than a predetermined value (hereinafter referred to as "reference value") by using the update urgency information (that is, the update urgency information acquired in step ST2) acquired by the update urgency information acquiring unit 23. The reference value is set to, for example, the value of the fourth level among the values of the above five levels.

When it is determined that the update urgency is equal to or higher than the reference value (step ST11 "YES"), in step ST12, the update method setting unit 25 determines whether or not the data size is equal to or greater than a predetermined threshold value (hereinafter referred to as "first threshold value") by using the data size information (that is, the data size information acquired in step ST1) acquired by the data size information acquiring unit 22. The first threshold value is set to, for example, 10 megabytes.

When it is determined that the data size is less than the first threshold value (step ST12 "NO"), in step ST13, the update method setting unit 25 determines whether or not the data size is equal to or less than a predetermined threshold value (hereinafter referred to as "second threshold value") by using the data size information (that is, the data size information acquired in step ST1) acquired by the data size information acquiring unit 22. The second threshold value is set to a value smaller than the first threshold value.

When it is determined that the update urgency is less than the reference value (step ST11 "NO"), in step ST14, the update method setting unit 25 sets the software update method to the first update method. In addition, when it is determined that the update urgency is equal to or greater than the reference value and the data size is determined to be equal to or greater than the first threshold value (step ST11 "YES" and step ST12 "YES"), in step ST14, the update method setting unit 25 sets the software update method to the first update method. At this time, the display control unit 29 may execute a control for displaying the first update notice image on the display device 13.

When it is determined that the update urgency is equal to or greater than the reference value and the data size is determined to be a value between the first and second threshold values (step ST11 "YES" and step ST12 "NO" and step ST13 "NO"), in step ST15, the update method setting unit 25 sets the software update method to the first update method or the second update method depending on the operation input to the operation input device 14 by the user.

That is, when it is determined "NO" in step ST13, the display control unit 29 executes a control for displaying an image for selecting the software update method (hereinafter referred to as "update method selection image") on the display device 13. The user selects the first update method or the second update method by the operation input to the update method selection image using the operation input device 14. Then, in step ST15, the update method setting unit 25 sets the software update method to the selected update method.

Here, when the software update method is set to the first update method (step ST16 "YES"), the display control unit 29 may execute a control for displaying the first update notice image on the display device 13. When the software update method is set to the second update method (step ST16 "NO"), the display control unit 29 may execute a control for displaying an image that gives notice of the software update by the second update method (hereinafter, referred to as "second update notice image") on the display device 13.

When it is determined that the update urgency is equal to or greater than the reference value and the data size is determined to be equal to or less than the second threshold value (step ST11 "YES" and step ST12 "NO" and step ST13 "YES"), in step ST17, the update method setting unit 25 sets the software update method to the second update method. At this time, the display control unit 29 may execute a control for displaying the second update notice image on the display device 13.

With the software update method set to the first update method (that is, following step ST5, following step ST14, or when step ST16 "YES"), in step ST21, the battery remaining amount information acquiring unit 21 acquires the battery remaining amount information. Next, in step ST22, the update method setting unit 25 determines whether or not the battery remaining amount is equal to or less than a predetermined amount (hereinafter referred to as "first reference amount") by using the acquired battery remaining amount information.

Note that, the first reference amount is for controlling the execution timing (that is, execution condition) of the reservation process or the like, and is conceptually essentially different from the update reference amount. Therefore, the first reference amount may be set to a value equivalent to the update reference amount, or may be set to a value different from the update reference amount.

The update control device 100 repeatedly executes processing of the steps ST21 and ST22 until the battery remaining amount becomes equal to or less than the first reference amount. When the battery remaining amount becomes equal to or less than the first reference amount (step ST22 "YES"), in step ST23, the search result information acquiring unit 24 acquires the search result information from the navigation device 12.

That is, when it is determined "YES" in step ST22, the update method setting unit 25 instructs the navigation device 12 to execute a search process. The navigation device 12 executes a search process for peripheral charging stations in response to the instruction. Then, in step ST23, the search result information acquiring unit 24 acquires the search result information from the navigation device 12.

Next, in step ST24, the update method setting unit 25 determines the presence or absence of a charging station 2 that the vehicle 1 can reach with the current battery remaining amount (hereinafter referred to as "reachable charging station") by using the battery remaining amount information acquired by the battery remaining amount information acquiring unit 21 (more specifically, the battery remaining amount information acquired in the latest step ST22) and the search result information acquired by the search result information acquiring unit 24 (that is, the search result information acquired in step ST23).

Note that, in the example shown in FIG. 4, the search process is executed when the battery remaining amount becomes equal to or less than the first reference amount (step ST22 "YES"). Therefore, the search target area in the search process is an area including the host vehicle position when the battery remaining amount becomes equal to or less than the first reference amount. Further, the reachable charging station is a charging station 2 that the vehicle 1 can reach with the battery remaining amount equal to or less than the first reference amount when the battery remaining amount becomes equal to or less than the first reference amount.

When it is determined that there is no reachable charging station (step ST24 "NO"), in step ST25, the update method setting unit 25 determines whether or not the update urgency is equal to or higher than the reference value by using the update urgency information acquired by the update urgency information acquiring unit 23 (that is, the update urgency information acquired in step ST2).

When it is determined that there is one or more reachable charging stations (step ST24 "YES"), the update method setting unit 25 continues the state in which the software update method is set to the first update method (step ST26).

When it is determined that there is no reachable charging station and the update urgency is determined to be equal to or higher than the reference value (step ST24 "NO" and step ST25 "YES"), in step ST27, the update method setting unit 25 resets the software update method to the second update method. At this time, the display control unit 29 may execute a control for displaying an image indicating that there is no reachable charging station on the display device 13 and displaying the second update notice image on the display device 13.

When it is determined that there is no reachable charging station and the update urgency is determined to be less than the reference value (step ST24 "NO" and step ST25 "NO"), in step ST28, the update control unit 28 cancels the execution of the update control. At this time, the display control unit 29 may execute a control for displaying an image indicating that there is no reachable charging station on the display device 13, and displaying an image indicating that the execution of the update process has been canceled on the display device 13.

Note that, when the processing of step ST11 has already been executed, the processing of step ST25 may be skipped. In this case, the update method setting unit 25 may use the determination result by the processing of step ST11 instead of the determination result by the processing of step ST25.

Following step ST26, in step ST31, the reservation target setting unit 26 determines whether or not the battery remaining amount is equal to or less than a predetermined amount (hereinafter referred to as "second reference amount") by using the battery remaining amount information (more specifically, the battery remaining amount information acquired in the latest step ST22) acquired by the battery remaining amount information acquiring unit 21. The second reference amount is set to a value smaller than, for example, the first reference amount.

When it is determined that the battery remaining amount exceeds the second reference amount (step ST31 "NO"), in step ST32, the reservation target setting unit 26 sets one charging station 2 (hereinafter referred to as "selected charging station") selected by the operation input to the operation input device 14 by the user among one or more reachable charging stations as the reservation target charging station.

That is, when it is determined "NO" in step ST31, the display control unit 29 executes a control for displaying an image for selecting the reservation target charging station (hereinafter referred to as "charging station selection image") on the display device 13. The charging station selection image is, for example, a list-like image containing a list of one or more reachable charging stations, or a map-like image containing the positions of one or more reachable charging stations. The user selects one charging station 2 among one or more reachable charging stations by the operation input to the charging station selection image by using the operation input device 14. The reservation target setting unit 26 sets the selected one charging station 2, that is, the selected charging station as the reservation target charging station.

When it is determined that the battery remaining amount is equal to or less than the second reference amount (step ST31 "YES"), in step ST33, the reservation target setting unit 26 sets one charging station 2 (hereinafter referred to as "nearest charging station") nearest to the host vehicle position among one or more reachable charging stations as the reservation target charging station, by using the search result information (that is, the search result information acquired in step ST23) acquired by the search result information acquiring unit 24. Note that, the nearest charging station is also one charging station 2 nearest to the host vehicle position among one or more charging stations 2 included in the search result information, that is, one or more peripheral charging stations.

Following step ST32 or step ST33, in step ST34, the reservation process executing unit 27 executes the reservation process for the reservation target charging station set by the reservation target setting unit 26 (that is, the reservation target charging station set in step ST32 or step ST33). In addition, the reservation process executing unit 27 executes the reception request process and the storage request process for the set reservation target charging station.

Following step ST34, in step ST41, the update control unit 28 determines the success or failure of the reservation of the replacement battery 6.

That is, when one or more replacement batteries 6 being charged or charged are in the reservation target charging station, a process of setting one replacement battery 6 among the one or more replacement batteries 6 as the reservation target battery is executed in the reservation target charging station. In addition to this, a process of transmitting information indicating that the replacement battery 6 has been successfully reserved (hereinafter referred to as "reservation success information") to the vehicle 1 is executed in the reservation target charging station. In this case, the reservation success information is received by the wireless communication device 11.

On the other hand, when there is no replacement battery 6 being charged or charged in the reservation target charging station, a process of transmitting information indicating that the reservation of the replacement battery 6 has failed (hereinafter referred to as "reservation failure information") to the vehicle 1 is executed in the reservation target charging station. In this case, the reservation failure information is received by the wireless communication device 11.

The update control unit 28 determines the success or failure of the reservation of the replacement battery 6 on the basis of which of the reservation success information and the reservation failure information is received by the wireless communication device 11.

When the reservation of the replacement battery 6 has been successful (step ST41 "YES"), in step ST42, the update control unit 28 executes the first update control after the replacement of the battery 5. By the first update control, a process of updating the software to be updated using the update data stored in the memory 8 of a battery 5 after the replacement and the like are executed in the vehicle 1. Note that, when the first update control is started, the display control unit 29 may execute a control for displaying an image indicating that the software update by the first update method is started on the display device 13.

When the reservation of the replacement battery 6 has failed (step ST41 "NO"), in step ST43, the update control unit 28 cancels the execution of the update control. At this time, the display control unit 29 may display an image indicating that the reservation of the replacement battery 6 has failed on the display device 13, and display an image indicating that the execution of the update control has been canceled on the display device 13.

When the software update method is set to the second update method (that is, when step ST16 "NO", or following step ST17, or following step ST27), the update control unit 28 executes the second update control. By the second update control, a process of receiving the update data from the server 3 using the wireless communication device 11 and a process of updating the software to be updated using the received update data are executed in the vehicle 1. Note that, when the second update control is started, the display control unit 29 may execute a control for displaying an image indicating that the software update by the second update method is started on the display device 13.

Note that, when the reservation of the replacement battery 6 has failed (step ST41 "NO"), the processing by the update method setting unit 25 may return to step ST32 instead of canceling the execution of the update control by the update control unit 28 (step ST43).

That is, when it is determined "NO" in step ST41, the display control unit 29 executes a control for displaying the charging station selection image on the display device 13. The user selects one charging station 2 among one or more reachable charging stations by the operation input to the charging station selection image by using the operation input device 14. The reservation target setting unit 26 sets the selected one charging station 2, that is, the selected charging station as the reservation target charging station. Note that, the charging station selection image in this case may exclude the charging station 2 that has failed to reserve the replacement battery 6.

Further, the execution condition of the processing in step ST23 is not limited to the condition that it is determined "YES" in step ST22. That is, the execution condition of the search process and the reservation process (as well as the reception request process and the storage request process, etc.) is not limited to the condition that the battery remaining amount becomes equal to or less than the first reference amount.

For example, when the update method setting unit 25 sets the software update method to the first update method (that is, following step ST5, or following step ST14, or when step ST16 "YES"), the display control unit 29 may execute a control for displaying an image for selecting whether or not to update the software by the first update method (hereinafter referred to as "update OK or NG selection image") on the display device 13. The user selects whether or not to update the software by the first update method by operation input to the update OK or NG selection image by using the operation input device 14. The update method setting unit 25 may execute the processing of step ST23 when "OK" is selected by the operation input. That is, the search process and the reservation process (as well as the reception request process and the storage request process, etc.) may be executed without waiting for the battery remaining amount to become equal to or less than the first reference amount.

Further, when the battery 5 is replaced, the update control unit 28 may determine whether or not a battery 5 after the replacement corresponds to the reservation target battery. The update control unit 28 may cancel the execution of the first update control when it is determined that the battery 5 after the replacement does not correspond to the reservation target battery. In this case, the display control unit 29 may execute a control for displaying an image indicating that the battery 5 after the replacement does not correspond to the reservation target battery on the display device 13.

For example, a unique identifier is assigned to each battery 5. That is, a unique identifier is assigned to each replacement battery 6. Further, the memory 8 of each battery 5 stores information indicating an identifier assigned to the corresponding battery 5. That is, each replacement battery 6 stores information indicating an identifier assigned to the corresponding replacement battery 6. Further, the reservation success information includes information indicating an identifier assigned to the reservation target battery.

When the battery 5 is replaced, the update control unit 28 compares the identifier stored in the memory 8 of a battery 5 after the replacement with the identifier included in the reservation success information received by the wireless communication device 11. When these identifiers match each other, the update control unit 28 determines that the battery 5 after the replacement corresponds to the reservation target battery. On the other hand, when these identifiers do not match each other, the update control unit 28 determines that the battery 5 after the replacement does not correspond to the reservation target battery.

Further, the first threshold value to be compared with the data size may be freely set by the operation input to the operation input device 14 by the user. The first threshold value may be set, for example, in a state where a dedicated setting screen is displayed on the display device 13.

Further, the first reference amount to be compared with the battery remaining amount may be freely set by the operation input to the operation input device 14 by the user. The first reference amount may be set, for example, in a state where a dedicated setting screen is displayed on the display device 13.

Further, the reservation target setting unit 26 may be provided inside the control device 15 and outside the update control device 100. That is, the main part of the update control device 100 may be configured by the update method setting unit 25 and the reservation process executing unit 27.

Further, it is enough that the update method setting unit 25 selectively sets the software update method to the first update method or the second update method by using at least one of the battery remaining amount information, the data size information, the update urgency information, or the search result information. That is, the setting method by the update method setting unit 25 is not limited to the specific example shown in FIG. 4.

For example, the update method setting unit 25 may set the software update method by using the battery remaining amount information. That is, when the battery remaining amount is less than the update reference amount, the update method setting unit 25 sets the software update method to the first update method. When the battery remaining amount is equal to or greater than the update reference amount, the update method setting unit 25 sets the software update method to the second update method.

Alternatively, for example, the update method setting unit 25 may set the software update method by using the data size information. That is, when the data size is equal to or greater than the first threshold value, the update method setting unit 25 sets the software update method to the first update method. When the data size is a value between the first threshold value and the second threshold value, the update method setting unit 25 sets the software update method to the first update method or the second update method depending on the operation input to the operation input device 14 by the user. When the data size is equal to or less than the second threshold value, the update method setting unit 25 sets the software update method to the second update method.

Alternatively, for example, the update method setting unit 25 may set the software update method by using the update urgency information. That is, the update method setting unit 25 sets the software update method to the first update method when the update urgency is less than the reference value. When the update urgency is equal to or higher than the reference value, the update method setting unit 25 sets the software update method to the second update method.

Alternatively, for example, the update method setting unit 25 may set the software update method by using the search result information. That is, when the search result information includes one or more reachable charging stations, the update method setting unit 25 sets the software update method to the first update method. When the search result information does not include any reachable charging station, the update method setting unit 25 sets the software update method to the second update method.

Alternatively, for example, the update method setting unit 25 may set the software update method by using the battery remaining amount information and the data size information. That is, when the battery remaining amount is less than the update reference amount, the update method setting unit 25 sets the software update method to the first update method. When the battery remaining amount is equal to or greater than the update reference amount and the data size is equal to or greater than the first threshold value, the update method setting unit 25 sets the software update method to the first update method. When the battery remaining amount is equal to or greater than the update reference amount and the data size is a value between the first threshold value and the second threshold value, the update method setting unit 25 sets the software update method to the first update method or the second update method depending on the operation input to the operation input device 14 by the user. When the battery remaining amount is equal to or greater than the update reference amount and the data size is equal to or less than the second threshold value, the update method setting unit 25 sets the software update method to the second update method.

Alternatively, for example, the update method setting unit 25 may determine the software update method by using the battery remaining amount information and the update urgency information. That is, when the battery remaining amount is less than the update reference amount, the update method setting unit 25 sets the software update method to the first update method. When the battery remaining amount is equal to or greater than the update reference amount and the update urgency is less than the reference value, the update method setting unit 25 sets the software update method to the first update method. When the battery remaining amount is equal to or greater than the update reference amount and the update urgency is equal to or higher than the reference value, the update method setting unit 25 sets the software update method to the second update method.

Alternatively, for example, the update method setting unit 25 may set the software update method by using the battery remaining amount information and the search result information. That is, when the search result information includes one or more reachable charging stations, the update method setting unit 25 sets the software update method to the first update method. When the search result information does not include any reachable charging station and the battery remaining amount is equal to or greater than the update reference amount, the update method setting unit 25 sets the software update method to the second update method. However, when the search result information does not include any reachable charging station and the battery remaining amount is less than the update reference amount, the execution of the update control is canceled.

Alternatively, when the battery remaining amount is equal to or greater than the update reference amount, the update method setting unit 25 sets the software update method to the second update method. When the battery remaining amount is less than the update reference amount and the search result information includes one or more reachable charging stations, the update method setting unit 25 sets the software update method to the first update method. However, when the battery remaining amount is less than the update reference amount and the search result information does not include any reachable charging station, the execution of the update control is canceled.

Alternatively, for example, the update method setting unit 25 may set the software update method by using the data size information and the update urgency information. That is, the update method setting unit 25 sets the software update method to the first update method when the update urgency is less than the reference value. When the update urgency is equal to or higher than the reference value and the data size is equal to or greater than the first threshold value, the update method setting unit 25 sets the software update method to the first update method. When the update urgency is equal to or higher than the reference value and the data size is a value between the first threshold value and the second threshold value, the update method setting unit 25 sets the software update method to the first update method or the second update method depending on the operation input to the operation input device 14 by the user. When the update urgency is equal to or higher than the reference value and the data size is equal to or less than the second threshold value, the update method setting unit 25 sets the software update method to the second update method.

Alternatively, for example, the update method setting unit 25 may set the software update method by using the data size information and the search result information. That is, when the search result information does not include any reachable charging station, the update method setting unit 25 sets the software update method to the second update method. When the search result information includes one or more reachable charging stations and the data size is equal to or greater than the first threshold value, the update method setting unit 25 sets the software update method to the first update method. When the search result information includes one or more reachable charging stations and the data size is a value between the first threshold value and the second threshold value, the update method setting unit 25 sets the software update method to the first update method or the second update method depending on the operation input to the operation input device 14 by the user. When the search result information includes one or more reachable charging stations and the data size is equal to or less than the second threshold value, the update method setting unit 25 sets the software update method to the second update method.

Alternatively, for example, the update method setting unit 25 may set the software update method by using the update urgency information and the search result information. That is, when the search result information does not include any reachable charging station, the update method setting unit 25 sets the software update method to the second update method. When the search result information includes one or more reachable charging stations and the update urgency is equal to or higher than the reference value, the update method setting unit 25 sets the software update method to the second update method. When the search result information includes one or more reachable charging stations and the update urgency is less than the reference value, the update method setting unit 25 sets the software update method to the first update method.

As described above, the update control device 100 of the first embodiment is the update control device 100 that controls update of software for one of the electronic devices 7 in the vehicle 1 driven by the replaceable battery 5, and includes: the update method setting unit 25 for selectively setting an update method of the software to either the first update method by replacement of the battery 5 or the second update method by wireless communication, by using at least one of information indicating a remaining amount of the battery 5 (battery remaining amount information), information indicating a size of data to be used for the update (data size information), information indicating an urgency of the update (update urgency information), or information indicating a search result of one or more charging stations 2 (search result information) in a search target area including a position of the vehicle 1 (host vehicle position); and the reservation process executing unit 27 for executing, when the update method is set to the first update method, the reservation process of making a reservation for the replacement battery 6 to the reservation target charging station among the charging stations 2 included in the search result and the storage request process of requesting the reservation target charging station to store the data in the replacement battery 6. As a result, the software update method can be selectively set to either the first update method or the second update method, depending on at least one of the battery remaining amount, data size, update urgency, or search result of the peripheral charging stations. As a result, the efficiency of software update can be improved.

Further, the reservation process executing unit 27 executes the reservation process and the storage request process when the remaining amount is equal to or less than the first reference amount. As a result, when the battery remaining amount decreases (more specifically, when the battery remaining amount becomes equal to or less than the first reference amount), the reservation process or the like can be executed.

Further, the update method setting unit 25 sets the update method to the first update method when the size is equal to or greater than the first threshold value. This makes it possible to prevent the software from being updated by OTA when the size of the update data is large. As a result, the amount of communication between the vehicle 1 and the server 3 can be reduced.

Further, the first threshold value can be freely set by the operation input to the operation input device 14. This makes it possible for the user to set the first threshold value to any value.

Further, the update control device 100 includes the reservation target setting unit 26 for setting a reservation target charging station by using information indicating the remaining amount and information indicating the search result, and the reservation target setting unit 26 sets, when the remaining amount is equal to or less than the second reference amount, the nearest charging station to the position (host vehicle position) among the charging stations 2 included in the search result as the reservation target charging station. As a result, when the battery remaining amount is low (more specifically, when the battery remaining amount is equal to or less than the second reference amount), the nearest charging station among the peripheral charging stations, that is, the nearest charging station among the reachable charging stations can be set as the reservation target charging station.

Further, when the urgency is equal to or higher than the reference value and the size is equal to or less than the second threshold value, the update method setting unit 25 sets the update method to the second update method. As a result, when the update urgency is high and the size of the update data is small, the software can be updated by OTA.

Further, when a charging station reachable by the vehicle 1 is not included in the search result and the urgency is equal to or higher than the reference value, the update method setting unit 25 sets the update method to the second update method. As a result, when the update urgency is high and there is no reachable charging station, the software can be updated by OTA.

Further, the first reference amount can be freely set by the operation input to the operation input device 14. This makes it possible for the user to set the first reference amount to any value.

Further, the update control method of the first embodiment is an update control method of controlling update of software for one of the electronic devices 7 in the vehicle 1 driven by the replaceable battery 5, in which the update method setting unit 25 selectively sets an update method of the software to either the first update method by replacement of the battery 5 or the second update method by wireless communication, by using at least one of information indicating a remaining amount of the battery 5 (battery remaining amount information), information indicating a size of data to be used for the update (data size information), information indicating an urgency of the update (update urgency information), or information indicating a search result of one or more charging stations 2 (search result information) in a search target area including a position of the vehicle 1 (host vehicle position), and the reservation process executing unit 27 executes, when the update method is set to the first update method, the reservation process of making a reservation for a replacement battery 6 to the reservation target charging station among the charging stations 2 included in the search result and the storage request process of requesting the reservation target charging station to store the data in the replacement battery 6. As a result, the software update method can be selectively set to either the first update method or the second update method, depending on at least one of the battery remaining amount, data size, update urgency, or search result of the peripheral charging stations. As a result, the efficiency of software update can be improved.

It should be noted that the invention of the present application is capable of modifying any of the components of the embodiment or omitting any of the components of the embodiment within the scope of the invention.

INDUSTRIAL APPLICABILITY

The update control device and update control method of the present invention can be used for updating software of electronic devices in a vehicle driven by a replaceable battery.

REFERENCE SIGNS LIST

1: vehicle, 2: charging station, 3: server, 4: network, 5: battery, 6: replacement battery, 7: electronic devices, 8: memory, 11: wireless communication device, 12: navigation device, 13: display device, 14: operation input device, 15: control device, 16: control device, 17: control device, 18: control device, 21: battery remaining amount information acquiring unit, 22: data size information acquiring unit, 23: update urgency information acquiring unit, 24: search result information acquiring unit, 25: update method setting unit, 26: reservation target setting unit, 27: reservation process executing unit, 28: update control unit, 29: display control unit, 31: processor, 32: memory, 33: processing circuit, 100: update control device, 200: software update system

The invention claimed is:

1. An update control device that controls update of software for one of electronic devices in a vehicle driven by a replaceable battery, the update control device comprising:
   processing circuitry
     to selectively set an update method of the software to either a first update method by replacement of the battery or a second update method by wireless communication, by using at least one of information indicating a remaining amount of the battery, information indicating a size of data to be used for the update, information indicating an urgency of the update, or information indicating a search result of one or more charging stations in a search target area including a position of the vehicle; and
     to execute, when the update method is set to the first update method, a reservation process of making a reservation for a replacement battery to a reservation target charging station among the charging stations included in the search result and a storage request process of requesting the reservation target charging station to store the data in the replacement battery.

2. The update control device according to claim 1, wherein the processing circuitry executes the reservation process and the storage request process when the remaining amount is equal to or less than a first reference amount.

3. The update control device according to claim 1, wherein the processing circuitry sets the update method to the first update method when the size is equal to or greater than a first threshold value.

4. The update control device according to claim 3, wherein the first threshold value can be freely set by operation input to an operation input device.

5. The update control device according to claim 1, wherein the processing circuitry sets the reservation target charging station by using the information indicating the remaining amount and the information indicating the search result, and the processing circuitry sets, when the remaining amount is equal to or less than a second reference amount, a charging station nearest to the position among the charging stations included in the search result as the reservation target charging station.

6. The update control device according to claim 1, wherein the processing circuitry sets, when the urgency is equal to or higher than a reference value, and the size is equal to or less than a second threshold value, the update method to the second update method.

7. The update control device according to claim 1, wherein the processing circuitry sets, when a charging station reachable by the vehicle is not included in the search result, and the urgency is equal to or higher than a reference value, the update method to the second update method.

8. The update control device according to claim 2, wherein the first reference amount can be freely set by operation input to an operation input device.

9. An update control method of controlling update of software for one of electronic devices in a vehicle driven by a replaceable battery, the method comprising:

selectively setting an update method of the software to either a first update method by replacement of the battery or a second update method by wireless communication, by using at least one of information indicating a remaining amount of the battery, information indicating a size of data to be used for the update, information indicating an urgency of the update, or information indicating a search result of one or more charging stations in a search target area including a position of the vehicle, and executing, when the update method is set to the first update method, a reservation process of making a reservation for a replacement battery to a reservation target charging station among the charging stations included in the search result and a storage request process of requesting the reservation target charging station to store the data in the replacement battery.

\* \* \* \* \*